(12) United States Patent
Thomas

(10) Patent No.: US 7,886,719 B2
(45) Date of Patent: Feb. 15, 2011

(54) SYSTEM AND METHOD TO COMPENSATE FOR VARIABLE FUEL INJECTOR CHARACTERIZATION IN A DIRECT INJECTION SYSTEM

(75) Inventor: Joseph Lyle Thomas, Kimball, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 751 days.

(21) Appl. No.: 11/848,105

(22) Filed: Aug. 30, 2007

(65) Prior Publication Data

US 2009/0056675 A1    Mar. 5, 2009

(51) Int. Cl.
*F02M 51/00* (2006.01)
*F02M 51/06* (2006.01)

(52) U.S. Cl. ........................ 123/478; 123/299

(58) Field of Classification Search ............... 123/478, 123/299, 300, 305, 456, 447, 472; 701/103
See application file for complete search history.

(56) References Cited

U.S. PATENT DOCUMENTS

| 5,634,448 | A | 6/1997 | Shinogle et al. | |
|---|---|---|---|---|
| 6,499,467 | B1 * | 12/2002 | Morris et al. | 123/467 |
| 6,718,946 | B2 * | 4/2004 | Hokazono et al. | 123/445 |
| 6,755,176 | B2 | 6/2004 | Takeuchi et al. | |

FOREIGN PATENT DOCUMENTS

EP    1344923    9/2003

* cited by examiner

*Primary Examiner*—Mahmoud Gimie
(74) *Attorney, Agent, or Firm*—Allan J. Lippa; Alleman Hall McCoy Russell & Tuttle LLP

(57) ABSTRACT

A method for controlling fuel injection timing of at least one fuel injector in a direct injection fuel delivery system of an internal combustion engine is presented. In one example, the timing of a second fuel pulse in a combustion cycle is adjusted in response to injector needle position bounce. The method can improve fuel delivery control.

20 Claims, 5 Drawing Sheets

SYSTEM AND METHOD TO COMPENSATE FOR VARIABLE FUEL INJECTOR CHARACTERIZATION IN A DIRECT INJECTION SYSTEM

BACKGROUND AND SUMMARY

In an engine system which utilizes a direct injection fuel delivery system, accurate fuel metering is imperative for efficient operation of the engine system. Fuel control strategies may take into account various delays relating to operation of fuel injectors in the direct injection fuel system in order to maintain accurate fuel control and, more particularly, accurate fuel injection timing. In particular, a control system may send fuel injection signals to one or more fuel injectors with timing that may be advanced in order to account for various types of delays associated with fuel injector hardware so that fuel injection may be performed at a desired time.

For example, some fuel control strategies may advance signal timing to account for opening and closing delays of the fuel injectors. In one example, a fuel injection signal time may be advanced uniformly to account for either an opening delay or a closing delay of a fuel injector needle. In other words, some fuel control strategies may assign a single value to an opening delay and/or a closing delay that may be used for all operating conditions.

However, the inventors herein have recognized that opening and closing delays of a fuel injector may vary according to changes in operating conditions and modes of engine operation. Thus, if constant response time delays are utilized throughout varying operating conditions, fuel metering may become inaccurate. In particular, the commanded fuel injection time may not match the desired fuel injection time due to variance of the actual response time delay compared with the constant response time delay value used by the fuel control system, which in turn, may result in an imbalance of delivered fuel and injection timing among each of the cylinders. The cylinder imbalance may lead to torque variations among the cylinder which may result in increased noise, vibration, and harshness (NVH). Further, the inaccurate fuel metering may lead to some, if not all, cylinders operating rich resulting in reduced fuel economy and increased tailpipe emissions.

Additionally, the inventors have also recognized that during modes of engine operation where multiple injection events occur during a cylinder event (e.g. split injection), changes in fuel pressure as well as duration between fuel injections may affect the response time delays associated with the fuel injector. In particular, after the end of injection of a fuel injection event, there exists a transient condition where fuel injector needle bounce occurs and the needle bounce may affect the response time delays of the fuel injector since the fuel injector needle may have to travel less distance at the start of injection. Furthermore, changes in fuel pressure may affect fuel injector needle bounce and the response time delays of the fuel injector.

In one approach, at least some of the above issues may be addressed by a method for controlling fuel injection timing of at least one fuel injector in a direct injection fuel delivery system of an internal combustion engine during a mode of engine operation where a plurality of fuel injection events are performed by the at least one fuel injector during a cylinder event is provide. The method includes, during a first fuel injector needle bounce condition following the end of injection of a first fuel injection event, sending a start of injection signal for a second fuel injection event at a first time, and during a second fuel injector needle bounce condition following the end of injection of the first fuel injection that differs from the first fuel injector needle bounce condition, sending the start of injection signal for the second fuel injection event at a second time that is earlier than the first time.

By recognizing transient conditions where needle bounce occurs and actively compensating for the transient conditions by modifying the opening delay time of the fuel injector needle based on fuel pressure and fuel injector needle bounce behavior, fuel injection timing accuracy may be maintained even as operating conditions change. In this way, fuel metering accuracy may be improved across the operating range of the engine system and cylinder balancing and fuel economy performance may be improved and tailpipe emissions may be reduced.

Furthermore, the improved accuracy of fuel injection timing generated from the control routine may provide greater control resolution which in turn may facilitate the use of fuel injector hardware with looser operational tolerances without a substantially reduction in fuel metering accuracy. In this way, cost of components may be reduced while still maintaining accurate fuel metering.

DETAILED DESCRIPTION

Figure 1:
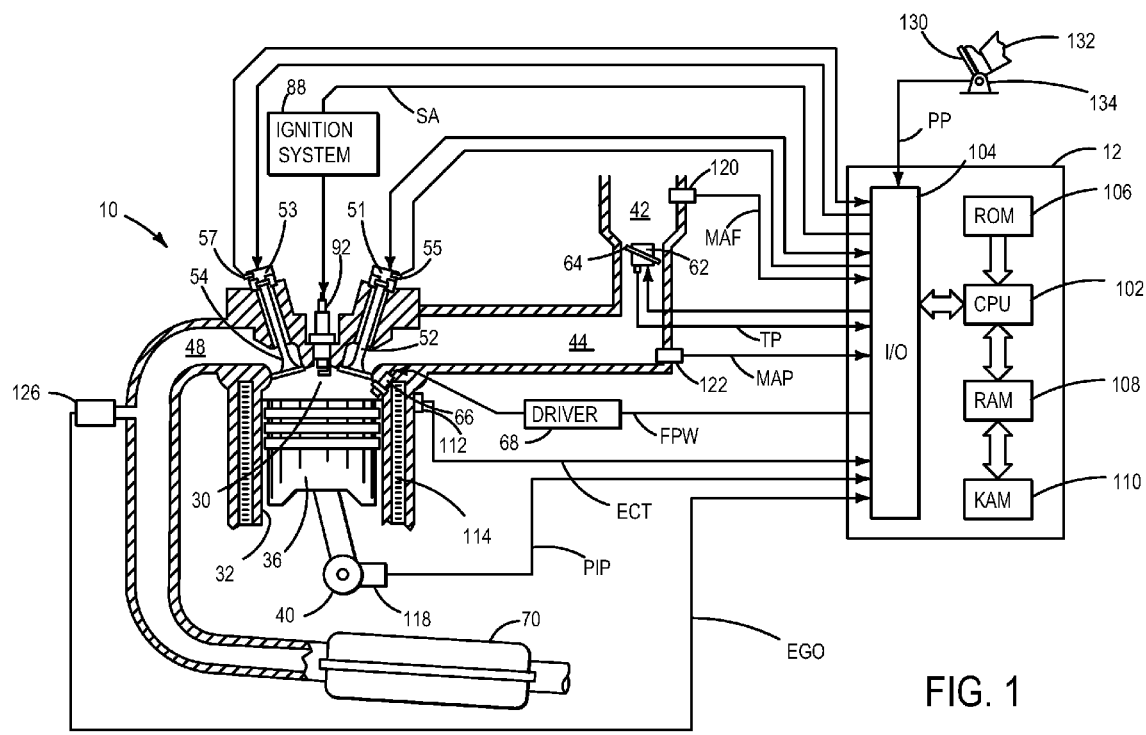
FIG. 1 shows a schematic diagram featuring one cylinder of an example engine system.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake passage 44 via intake manifold 42 and may exhaust combustion gases via exhaust passage 48. Intake passage 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 via electric valve actuator (EVA) 51. Similarly, exhaust valve 54 may be controlled by controller 12 via EVA 53. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system described in further detail in FIG. 2. In some embodiments, combustion chamber 30 may alternatively or additionally include a fuel injector arranged in intake passage 44 in a configuration that provides what is known as port injection of fuel into the intake port upstream of combustion chamber 30.

Intake manifold 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake manifold 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft. Further, it will be appreciated that the fuel system may provide various signals and/or information to the controller and will be discussed in further detail with reference to FIG. 2.

Note that FIG. 1 shows only one cylinder of a multi-cylinder engine, and that each cylinder may similarly include its own set of intake/exhaust manifold valves, fuel injector, spark plug, etc. In one example, the engine cylinders may operate in a particular predetermined firing order, as determined by the valve timing.

Figure 2:
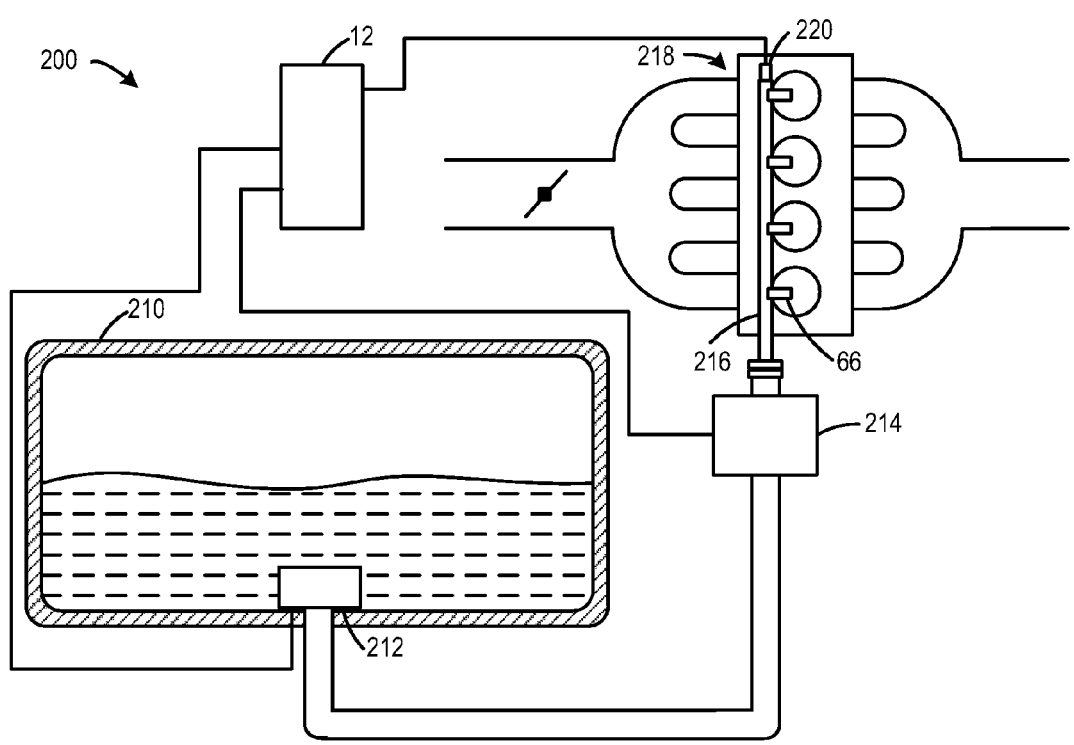
FIG. 2 shows a schematic diagram of an example fuel system.

Referring now to FIG. 2, an example fuel system with high pressure direct fuel injection is schematically shown at 200. Fuel system 200 may include fuel tank 210 is shown with a first fuel pump 212, which may be mounted internal, adjacent, or external to fuel tank 210. The first fuel pump 212 may be referred to as a low pressure pump and may increase fuel pressure to a moderate pressure level (e.g. approximately 4 bar). Pressurized fuel may exit the first pump 212 and may be delivered to a second fuel pump 214 which may be referred to as a high pressure pump, that may increase the fuel pressure to a substantially higher pressure level (e.g. approximately 50-150 bar), depending on operating conditions. The second fuel pump 214 may deliver pressurized fuel to fuel rail 216, which then distributes the fuel to a plurality of direct fuel injectors 218, one of which may be fuel injector 66.

Fuel pressure may be measured by fuel rail pressure sensor 220. Fuel rail pressure sensor 220 may send pressure measurement signals to controller 12 in order to control fuel pressure throughout various operating conditions. In particular, first fuel pump 212 and second fuel pump 214 may be in communication with controller 12 and may receive command signals to adjust fuel pressure based on various operating conditions and/or modes of engine operation. In one example, the second fuel pump 214 may have an adjustable pump stroke that may be adjusted by controller 12 to vary the increase in fuel pressure generated depending on operating conditions.

Note that while FIG. 2 shows various direct connections, such as between the first and second pumps, various additional valves, filters, and/or other devices may be intermediately connected, yet still enable the first and second pumps to be coupled.

Figure 3:
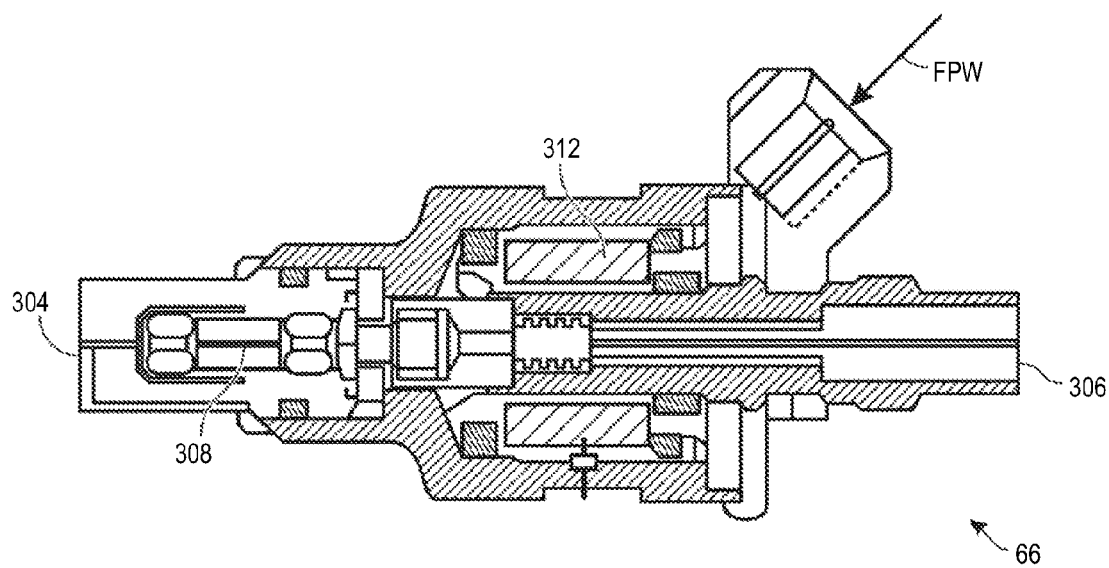
FIG. 3 shows a schematic diagram of an example fuel injector.

Now turning to FIG. 3, a cross-sectional view of an example electronic fuel injector that may be included in a direct fuel injection system as described above is shown. Fuel injector 66 may receive fuel pulse width signal FPW from controller 12 to control fuel injection. Signal FPW governs fuel injection by energizing electromagnetic actuator coil 312 to initiate the start of injection (SOI) of fuel from fuel injector 66. Additionally, FPW may dictate the end of injection (EOI) of fuel from fuel injector 66. In particular, during fuel injection pressurized fuel may be supplied from fuel rail 216 (shown in FIG. 2) to fuel injector 66 via inlet 302, the flow of which is governed by electromagnetic actuator having coil 312, coupled to needle 308 which lifts from valve seat 304 to spray fuel into cylinder 30.

It will be appreciated that various needle hardware characteristics, such as for example, the shape of the needle may affect the spray geometry as well as the flow rate of the injector. Further, the size and shape of the needle may also affect flow and spray patterns, as well as response time. In particular, each different type of fuel injector may have a different response time delay attributed to the particular type of fuel injector that may affect the SOI and EOI.

Furthermore, as discussed above, SOI and EOI response time delays may vary according to changes in fuel pressure. In particular, the needle of the fuel injector must act upon and overcome the fuel rail pressure in order to achieve SOI and/or EOI. Accordingly, a fuel injector may require more or less time and/or energy to carry out SOI and/or EOI operations depending on the fuel rail pressure.

Thus, in order to meter an amount of fuel accurately according to a desired injection timing (or desired injection angle) in each cylinder across the operating range of the vehicle, in one example, a fuel control strategy may be employed that varies the response time delays of fuel control signals for SOI and EOI according to changes in fuel pressure. In particular, the fuel injector opening delays and closing delays may be mapped as a function of fuel pressure.

Figure 4:
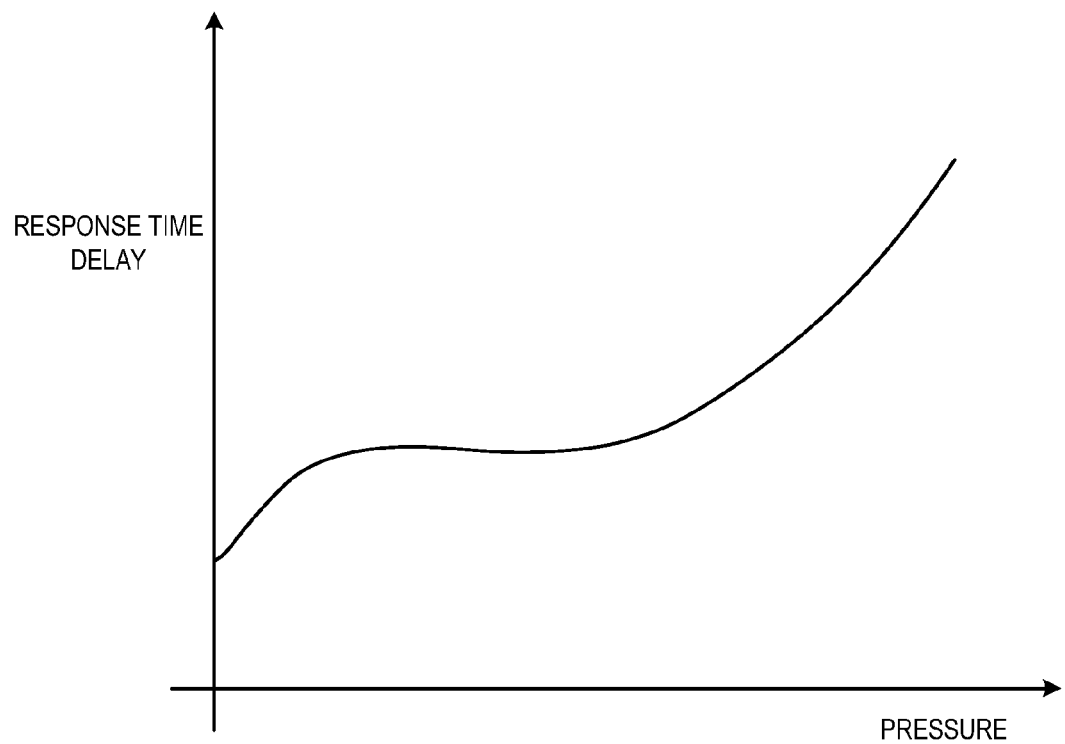
FIG. 4 shows a graphical representation of an example response time delay adder map utilized as part of a fuel metering strategy.

FIG. 4 shows an example response time delay adder map that may be utilized as part of the above discussed fuel control strategy. The map may be indicative of the response time delay considered by fuel injection arbitration in the controller when sending a SOI and/or EOI signal to a fuel injector. As shown, the length of the response time delay varies according to changes in fuel pressure. In general, the map shows that as fuel pressure increases the response time delay also increases. It will be appreciated that multiple different response time delay adder maps may be utilized in the fuel control strategy. For example, a first response time delay map may be applied to SOI and a second time delay map that is different from the first map may be applied to EOI. Alternatively, in some embodiments, the same response time delay map may be used for SOI and EOI. It will be appreciated that the response time delay adder map may be utilized to adjust the SOI and/or EOI for each of the fuel injectors in the engine system. Further, it will be appreciated that the map in FIG. 4 is an example and that other maps may be utilized. For example, crank angle position at time of injection may be mapped vs. pressure to determine suitable injection timing for each cylinder.

In one embodiment, the response time delay adder map of FIG. 4 may be implemented as a look up table in controller 12 (shown in FIG. 1). Controller 12 may receive a fuel pressure measurement and may look up the response time delay for SOI and/or EOI that corresponds to the fuel pressure measurement. The controller may adjust the time at which the fuel control signal value changes to initiate the SOI and/or the EOI to account for the response time delay. In one example, under a high fuel pressure condition, the controller may send a signal to initiate the SOI earlier since the response time delay may be increased due to the fact that the fuel injector needle may require more time to overcome the force of the high fuel pressure. As another example, under a low fuel pressure condition, the controller may send a signal to initiate the SOI later since the response time delay may be decreased due to the fact that the fuel injector needle may require less time to overcome the force of the low fuel pressure. By varying injection signal timing to include response time delays that vary based on changes in fuel pressure, fuel metering accuracy may be increased, which in turn, may lead to improved cylinder balancing, reduced emissions, and improved fuel economy performance.

In some embodiments, the above described engine control system may include various different engine control modes. In some engine control modes, the engine control system may command one or more fuel injectors of the engine system to perform multiple or split fuel injections during a single cylinder event (e.g. a four-stroke cycle). It will be appreciated that under some operating conditions, it may be desirable to perform split fuel injections, for example, to improve the operating efficiency of the engine, to regenerate emissions control devices in the exhaust system, to increase the operating temperature of various engine components, etc.

During engine control modes where multiple fuel injections are performed during a single cylinder event, fuel injection timing of the SOI of follow-on fuel injection events, that is, fuel injections performed after a first fuel injection event may be affected by the amount of time that elapses between the EOI of a previous fuel injection and the SOI of the next injection within a calibratible threshold time limit. In other words, a fuel injector needle opening response time delay may be a function of elapsed time between fuel injection events. The dependency may be associated with, among other things, the characteristics of the fuel injector hardware. In particular, during transient conditions after EOI, the fuel injector needle may not sit flush with the valve seat, but rather may move between an open position and a closed position relative to the valve seat. This phenomenon may be referred to herein as needle bounce.

During transient conditions where needle bounce occurs, less energy and time may be required to initiate a follow-on SOI because the fuel injector needle may have less distance to travel to reach an open position due to the needle being in motion as opposed to being in a fully closed position. Thus, during these transient conditions the response time delay of a follow-on SOI may be adjusted based on needle position or based on needle bounce behavior. Additionally (or alternatively), response time delay of a follow-on SOI may be adjusted based on duration of the previous fuel injection which may affect the fuel injector needle behavior. For example, in a substantially short fuel injection event, the needle may bounce and may not stabilize in an open position due to the short duration. The needle bounce behavior may affect the response time delay of a follow-on injection whereas a longer fuel injection duration may not affect the response delay time differently.

Note that the above discussed threshold time limit may correspond to the time at which the fuel injector needle settles in a closed position flush with the valve seat. Furthermore, the elapsed time up to the threshold time limit may correspond to the transient conditions under which fuel injector needle bounce occurs and/or the fuel injector needle does not sit flush on the valve seat. Furthermore, a threshold time may be applied to duration of a previous fuel injection event to determine whether or not the duration may affect the response time delays of a follow-on injection.

In some embodiments, the response time delay of SOI of a follow-on fuel injection event may be mapped as a function of the amount of time that has elapsed since EOI of the previous fuel injection event. In particular, the map may show a relationship in which the response time delay grows as time elapses from the EOI of the previous injection event. This is due to the fact that as time elapses between fuel injection events needle bounce reduces which results in more travel of the needle required in order to move the needle to the open position during SOI, which in turn, result in a larger response time delay. The relationship between response time delay of SOI of a follow-on fuel injection and needle bounce behavior will be discussed in further detail below with reference to FIG. 5.

As discussed above, response time delays of SOI and EOI of a fuel injection event may vary according to fuel pressure. Furthermore, the inventors have recognized that fuel pressure may also affect the length of transient conditions under which needle bounce occurs and may be used to calibrate the threshold time limit in which needle bounce may affect the response time delay of SOI of a follow-on fuel injection. In particular, as fuel pressure varies the amount of force acting upon the fuel injector needle may vary so that the needle may have to overcome more or less force to travel between and open position and a closed position. Thus, the varying fuel pressure may alter the bounce behavior of the fuel injector needle and the amount of time required for the needle to stabilize in a closed position where the needle is flush with the valve seat.

Figure 5:
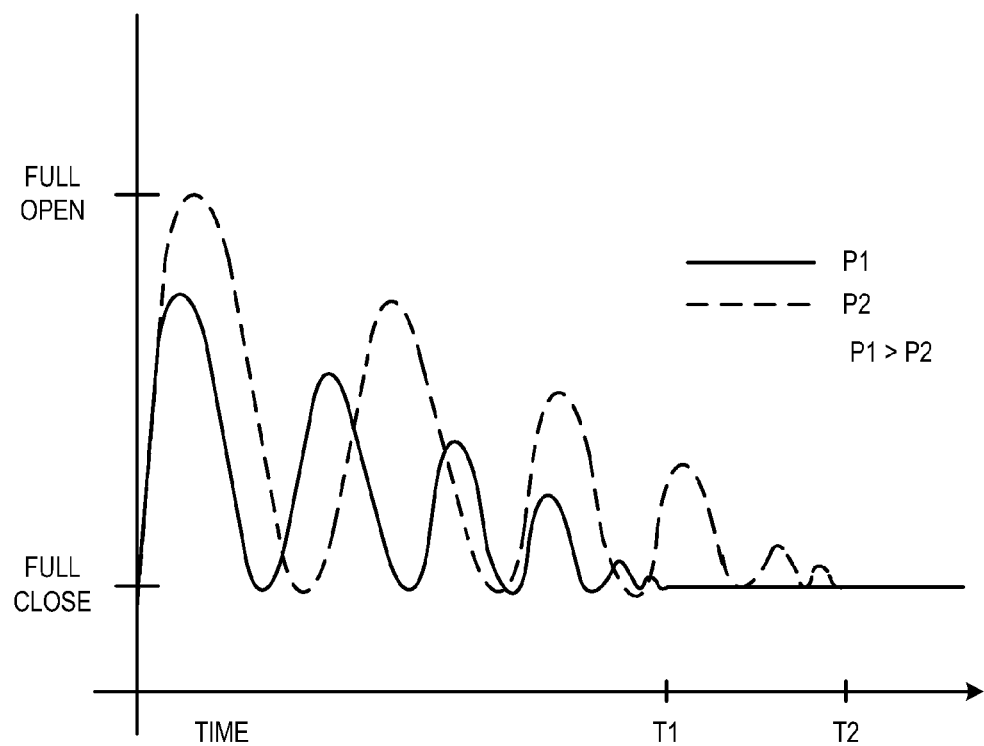
FIG. 5 shows a graphical representation of bounce characteristics of an example fuel injector needle.

Turning now to FIG. 5, a graphical representation of fuel injector needle bounce behavior which may occur during transient conditions after the EOI of a fuel injection event is shown. The graphical representation includes two needle bounce behavior traces over a period of time, the two needle bounce behavior traces corresponding to two different fuel pressure levels. A first trace depicted by a solid line shows the bounce behavior of a fuel injector needle at a first fuel pressure P1. A second trace depicted by a dashed line shows the bounce behavior of a fuel injector needle at a second fuel pressure P2 which is less than the first fuel pressure P1. The first trace starts with the fuel injector needle in a commanded fully closed position against the valve seat, however the closing force of the needle causes the needle to bounce off of the valve seat and the force generated from the bounce causes the needle to move up towards the full open position. The sequence of downward and upward travel of the fuel injector needle is repeated with the bounce force being reduced upon each bounce until the needle is stabilized in a closed position flush with the valve seat at a time T1. The second trace follows a path similar to the path of the first trace, however due to a lower fuel pressure the amplitude of the bounce behavior may be increased since less force from the fuel pressure may be acting on the fuel injector needle. The increased amplitude of the bounce behavior may result in a longer transient condition before the fuel injector needle stabilizes flush with the valve seat. Accordingly, the second trace stabilizes with the fuel injector needle in a closed position at time T2 which is an amount of elapsed time that is greater than time T1.

It will be appreciated that although transient conditions have been discussed with reference to needle bounce it will be appreciate that other operating parameters may vary during these conditions as well and may be taken into account when determining a response time delay. Further, it may be appreciated that general reference to a needle bounce condition may include conditions where substantially little or no needle bounce occurs.

Note that as the fuel pressure increases the amount of force from the fuel pressure acting on the fuel injector needle may aid in dampening the bounce force of the fuel injector needle resulting in shorter transient conditions for the fuel injector needle to stabilize.

Accordingly, based on the relationship between fuel pressure and fuel injection needle stabilization timing, the threshold time limit in which needle bounce may affect the response time delay of the SOI of a follow-on fuel injection may be calibrated based on the measured fuel pressure. In this way, during split fuel injection modes of operation fuel injection response time delays may be adjusted to maintain accurate fuel metering across the operating range of the engine system.

In one example, the response time delay of the SOI of a follow-on fuel injection event may be generated from a function of fuel pressure and predetermined fuel injector needle bounce behavior characteristics over time. Thus, the fuel pressure and the elapsed time sine the EOI of the previous fuel injection event may be inputted into a map to generate a response time delay of the SOI of the follow-on fuel injection event. By taking into consideration the fuel injector needle bounce behavior and the fuel pressure during transient conditions response delay time accuracy may be improved which, in turn, may improve fuel metering accuracy and cylinder balancing while reducing tailpipe emissions.

Figure 6:
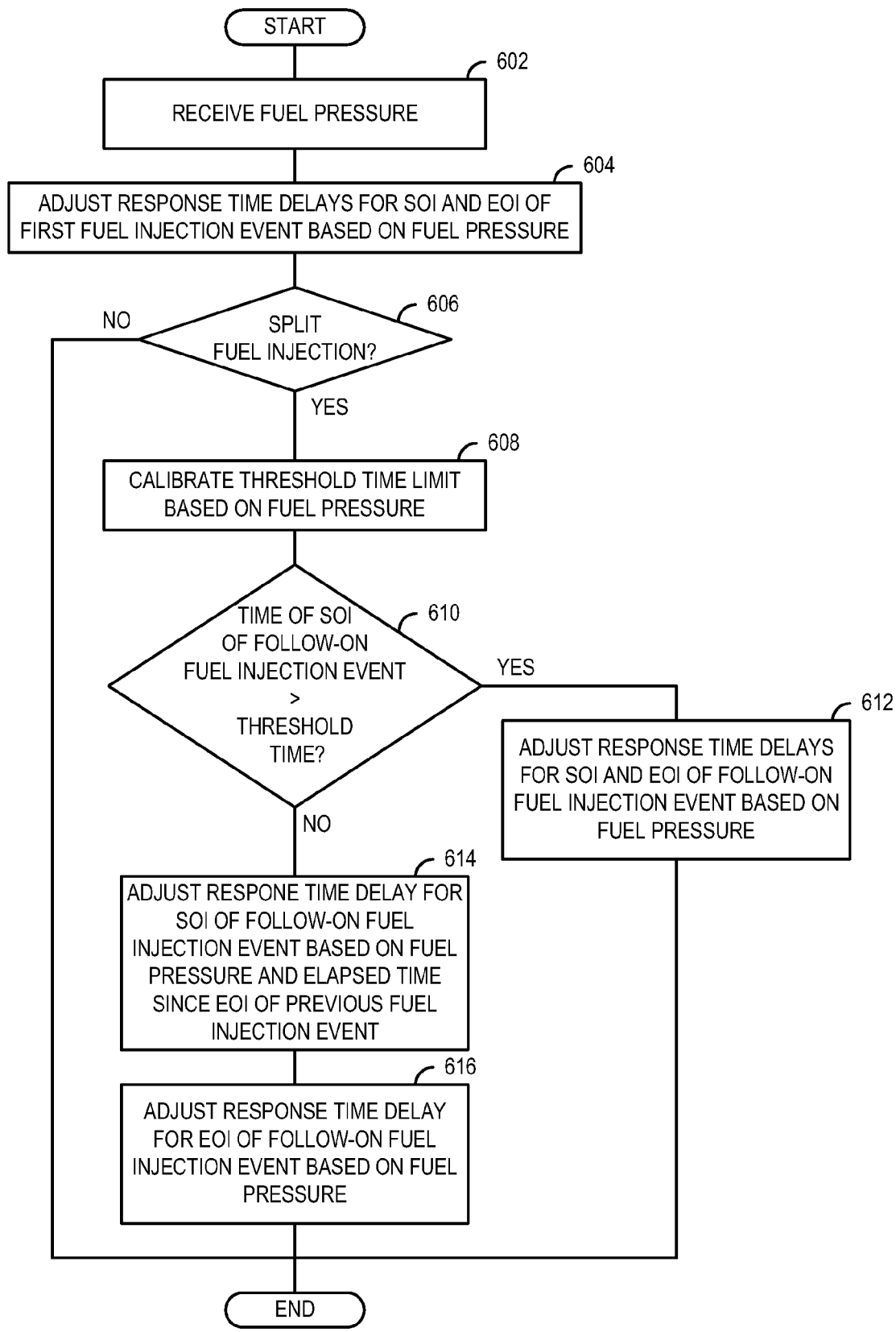
FIG. 6 shows an example high level flow diagram of a control routine for adjusting fuel injection timing according to different modes of operation.

Now turning to FIG. 6, an example control routine for adjusting response time delays associated with fuel injection events is shown. The control routine may be utilized in a fuel control strategy in order to facilitate accurate fuel metering across the operating range of the engine system. In particular, the control routine may take into account the dependency on fuel pressure for both opening response time delays and closing response time delays of the fuel injector needle during a fuel injection event and may increase or decrease the delay time based on the pressure to maintain accurate fuel metering. Furthermore, during split fuel injection operation, the control routine may recognize transient conditions where needle bounce may occur and may determine a threshold time limit for the transient conditions to stabilize based on fuel pressure. The control routine may adjust response time delays for follow-on fuel injection events based on whether or not the SOI of the fuel injection event occurs before the threshold time. By actively compensating for changes in fuel pressure and transient conditions between fuel injection events, injection timing accuracy may be improved and fueling errors may be reduced which in turn may improve fuel economy performance and cylinder balancing, and may reduce tailpipe emissions.

The control routine begins at 602, where the fuel pressure may be received. As discussed above, in some embodiments, fuel pressure may be measured by a pressure sensor located in the fuel rail. In some embodiments, fuel pressure may be derived from other fuel related parameters.

Next at 604, the response time delays for the SOI and the EOI of a first fuel injection event may be adjusted based on the received fuel pressure. In one example, the received fuel pressure may be applied to a response time delay adder map, such as the one shown in FIG. 4. The map may generate a response time delay that is a function of the fuel pressure. It will be appreciated that in some embodiments the response time delays for the SOI and the EOI may be generated from different maps or mapping operations. Alternatively, in some embodiments, the SOI and the EOI may be generated from the same map or mapping operation.

Next at 606, it may be determined if the engine system is operating in a split fuel injection mode. A split fuel injection mode may include multiple fuel injection events during a single cylinder event. If it is determined that the engine system is operating in a split fuel injection mode then the control routine moves to 608. Otherwise, the control routine ends.

At 608, the threshold time limit may be calibrated based on the received fuel pressure. The threshold time limit may be the time after the EOI of the first fuel injection event at which the fuel injector needle stabilizes in a closed position in the valve seat of the fuel injector. Prior to the threshold time limit, transient fuel injector needle bounce conditions may exist that may affect the response time delay of the SOI of a second fuel injection event. In particular, since the needle is not necessarily in a closed position during transient needle bounce conditions, less time and/or energy may be required to place the needle in an open position, and thus affecting the response time delay for SOI. Further, as discussed above with reference to FIG. 5, the amount of fuel pressure force acting on the fuel injector needle may affect the bounce behavior such that as fuel pressure varies the needle may have to overcome more or less fuel pressure force which may vary the extent of time needle bounce conditions occur. In one example, calibrating the threshold time may include extending the threshold time to account for longer transient conditions under which needle bounce occurs due to lower fuel pressures. As another example, calibrating the threshold time may include reducing the threshold time to account for shorter transient conditions under which needle bounce occurs due to higher fuel pressure conditions.

Next at 610, it is determined if the time of the SOI of a follow-on fuel injection event is greater than the threshold time. It will be appreciated that if the SOI of the follow-on fuel injection event occurs before the threshold time then the response delay time of the fuel injector may be affected by needle bounce behavior that may be occurring as a result of the EOI of the previous fuel injection event. Thus, by determining if the SOI of the follow-on fuel injection event occurs before or after the threshold time response time delays may be suitably adjusted to account for fuel injector needle bounce. Accordingly, if it is determined that the time of the SOI of the follow-on fuel injection event is greater than the threshold time the control routine moves to 612. Otherwise, it is determined that the time of the SOI of the follow-on fuel injection event is less than (or equal to) the threshold time and the control routine moves to 614.

At 612, the response time delays for the SOI and EOI of the follow-on fuel injection event may be adjusted based on fuel pressure and may not take into account needle bounce since the fuel injector needle may be stabilized in a closed position. As discussed above, in some embodiments, a response time delay adder map may be utilized to generate the response time delay for the SOI and the EOI. The response time delay adder map may generate the response time delays as a function of the received fuel pressure. In one particular example, under high fuel pressure conditions, SOI and EOI response time delay may be increased since it may take more time for the fuel injector needle to overcome the force of the fuel pressure.

At 614, the response time delay for the SOI of the follow-on fuel injection event may be adjusted based on fuel pressure and the elapsed time since the EOI of the previous fuel injection event. In other words, since the SOI of the follow-on fuel injection event is initiated during transient conditions where needle bounce occurs, the response time delay may be adjusted to account for both the fuel pressure and the bounce behavior of the fuel injector needle.

As discussed above, in some embodiments, a response time delay adder map may be utilized to generate the response time delay for SOI. In one example, the SOI response time delay may be mapped as a function of fuel pressure and needle bounce behavior which may be a function of elapsed time since EOI of the previous fuel injection event. In particular, as time elapses the needle bounce behavior may have a reduced affect on the response time delay of SOI since the bounce amplitude of the fuel injector needle may grow smaller with each bounce. In one particular example, the SOI of a follow-on injection may be commanded at a time after a small amount of time has elapsed since the EOI of the previous fuel injection event prior to a threshold time. Accordingly, transient conditions may exist and the fuel injector needle may have substantially large bounce amplitude meaning that the needle may have less distance to travel to an open position when the SOI of a follow-on injection is commanded. Since the needle has less distance to travel less time and/or energy may be required to initiate the SOI of the follow-on injection. Thus, in this example, the small amount of elapsed time may indicate large bounce amplitude which may reduce the response time delay of the injector needle. Further, it will be appreciated that fuel pressure may be considered with the elapsed time to generate a response time delay since the fuel injector needle may have to overcome a varying amount of force as fuel pressure varies which may affect response time of the fuel injector needle.

Next at 616, the response time delay of the EOI of the follow-on injection event may be adjusted based on the fuel pressure. As discussed above, in some embodiments, a response time delay adder map may be utilized to generate the response time delay for the SOI. The response time delay adder map may generate the response time delays as a function of the received fuel pressure. In one particular example, under high fuel pressure conditions, the EOI response time delay may be increased since it may take more time for the fuel injector needle to overcome the force of the fuel pressure. As another example, during low fuel pressure conditions, the EOI response time delay may be decreased since it may take less time for the fuel injector needle to overcome the force of the fuel pressure.

By recognizing transient fuel conditions where needle bounce occurs and actively compensating for the transient conditions by modifying the opening delay time of the fuel injector needle based on fuel pressure and fuel injector needle bounce behavior, fuel injection timing may remain accurate even as operating conditions change. In this way, fuel metering accuracy may be improved across the operating range of the engine system and cylinder balancing and fuel economy performance may be improved and tailpipe emissions may be reduced.

Furthermore, the improved accuracy of fuel injection timing generated from the control routine may provide greater control resolution which in turn may facilitate the use of fuel injector hardware with looser operational tolerances without a substantially reduction in fuel metering accuracy. In this way, cost of components may be reduced while still maintaining accurate fuel metering.

It will be appreciated that the above described control routine may be performed numerous times throughout vehicle operation. Further, it will be appreciated that the control routine may be performed multiple times within a single cylinder event when multiple fuel injection events occur.

In some embodiments, it will be appreciated that duration of the previous fuel injection event may be utilized to determine the response delay time of the SOI of the follow-on injection. In one example, upon a fuel injection duration being less than a threshold duration the response time delay may be reduced. In other words, the SOI signal may be sent earlier when the fuel injection duration is less than the threshold duration.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling fuel injection timing of at least one fuel injector in a direct injection fuel delivery system of an internal combustion engine during a mode of engine operation where a plurality of fuel injection events are performed by the at least one fuel injector during a cylinder event, the method comprising:
    during a first fuel injector needle position bounce following the end of injection of a first fuel injection event, sending a start of injection signal for a second fuel injection event at a first time, and during a second fuel injector needle position bounce following the end of injection of the first fuel injection that differs from the first fuel injector needle position bounce, sending the start of injection signal for the second fuel injection event at a second time that is earlier than the first time.

2. The method of claim 1 wherein the first needle position bounce includes a first needle position bounce amplitude and the second needle position bounce includes a second needle position bounce amplitude that is less than the first needle position bounce amplitude.

3. The method of claim 1 wherein the first needle position bounce includes a first amount of elapsed time since the end of injection of the first fuel injection event and the second needle position bounce includes a second amount of elapsed time that is greater than the first amount of elapsed time since the end of injection of the first fuel injection event.

4. The method of claim 1 further comprising:
    sending the start of injection signal for the second fuel injection event at a third time that is different from the first time and the second time based on a change in fuel pressure.

5. The method of claim 1 further comprising:
    sending the start of injection signal for the second fuel injection event at a third time that is different from the first time and the second time based on a duration of the first fuel injection event.

6. The method of claim 1 wherein the second needle position bounce includes substantially no needle bounce.

7. The method of claim 1 further comprising:
    varying the timing that the signals for start of injection and end of injection of the first fuel injection event are sent based on fuel pressure.

8. The method of claim 1 further comprising:
    advancing the timing that the start of injection signal is sent to the at least one fuel injector in response to the desired start of injection time of the second fuel injection event occurring after the threshold time.

9. The method of claim 1 wherein the threshold time is adjusted in response to a change in fuel pressure.

10. The method of claim 1 further comprising:
    adjusting the timing that an end of injection signal for the second fuel injection event is sent to the at least one fuel injector to account for a response time delay of the at least one fuel injector based on fuel pressure.

11. The method of claim 10 further comprising:
    adjusting the timing of advancement of a start of injection signal and an end of injection signal of the first fuel injection event based on fuel pressure.

12. The method of claim 11 wherein the timing of sending the start of injection signal and the timing of the end of injection signal for the first fuel injection event, as well as the advancement of the end of injection signal of the second fuel injection event, is advanced when fuel pressure is increased.

13. An engine system for a vehicle having at least one cylinder comprising:
    at least one fuel injector for directly injecting fuel into the at least one cylinder of an internal combustion engine;
    a fuel rail to supply fuel to the at least one fuel injector;
    a pressure sensor disposed in proximity to the fuel rail for measuring a fuel pressure of fuel in the fuel rail; and
    a control system configured to send signals to the at least one fuel injector to control fuel injection into the at least one cylinder of the internal combustion engine, during a mode of engine operation where a plurality of fuel injection events are performed by the at least one fuel injector during a cylinder event, the control system adjusting the timing at which a start of injection signal for a second fuel injection event is sent to the at least one fuel injector to account for a response time delay of the at least one fuel injector based on fuel pressure, duration of a first fuel injection event, and a desired start of injection time of the second fuel injection event occurring before a threshold time, the threshold time based on a time at which needle position bounce of the fuel injector stops.

14. The system of claim 13 wherein the control system is configured to advance the timing as fuel pressure decreases and duration of the first fuel injection event increases.

15. The system of claim 14 where in response to the desired start of injection time of the second fuel injection event occurring after the threshold time, the control system is configured to advance the timing at which the start of injection signal of the second fuel injection is sent to the at least one fuel injector.

16. A method for controlling fuel injection timing of at least one fuel injector in a direct injection fuel delivery system of an internal combustion engine, the method comprising:
    during a mode of engine operation where a plurality of fuel injection events are performed by the at least one fuel injector during a cylinder event, adjusting the timing at which a start of injection signal for a second fuel injection event is sent to the at least one fuel injector to account for a response time delay of the at least one fuel injector in response to a desired start of injection time of the second fuel injection event occurring before a threshold time, the threshold time based on a time at which needle position bounce of the fuel injector stops.

17. The method of claim 16 wherein adjusting the timing that the start of injection signal for the second fuel injection is sent in response to a change of an operating parameter.

18. The method of claim 16 wherein the operating parameter includes fuel pressure.

19. The method of claim 16 wherein the operating parameter includes duration of the first fuel injection event.

20. The method of claim 16 wherein timing that the start of injection signal is sent to the at least one fuel injector is advanced in response to the desired start of injection time of the second fuel injection event occurring before the threshold time.

* * * * *